United States Patent [19]

Shimazu

[11] Patent Number: 4,553,470
[45] Date of Patent: Nov. 19, 1985

[54] ASSISTOR FOR REDUCING STEPPING FORCE

[75] Inventor: Toshiaki Shimazu, Hirakata, Japan

[73] Assignee: Kabushiki Kaisha Daikin Seisakusho, Neyagawa, Japan

[21] Appl. No.: 716,598

[22] Filed: Mar. 27, 1985

Related U.S. Application Data

[63] Continuation of Ser. No. 520,259, Aug. 4, 1983, abandoned.

[30] Foreign Application Priority Data

Aug. 4, 1982 [JP] Japan ............................. 57-136561

[51] Int. Cl.$^4$ ............................................. F15B 15/10
[52] U.S. Cl. ............................................. 91/6; 91/395; 91/398; 60/551; 60/556; 137/907; 251/77; 251/61.4
[58] Field of Search ................... 91/394, 395, 398, 410, 91/434, 6, 359, 391 R; 60/551, 582, 556, 555, 547.1; 137/625.4, DIG. 8; 251/77, 61.4, 343

[56] References Cited

U.S. PATENT DOCUMENTS

| | | | |
|---|---|---|---|
| 2,873,724 | 2/1959 | Olnhausen | 91/434 |
| 2,974,494 | 3/1961 | Rike | 91/376 |
| 3,075,499 | 1/1963 | Prather | 91/434 |
| 3,082,744 | 3/1963 | Gardner | 60/555 |
| 3,138,071 | 6/1964 | Sadler | 60/551 |
| 3,183,671 | 5/1965 | Chouings | 60/551 |
| 3,321,173 | 5/1967 | Seger | 251/61.4 |
| 3,408,815 | 11/1968 | Stelzer | 60/551 |
| 3,691,906 | 9/1972 | Kreuter | 91/398 |
| 3,845,932 | 11/1974 | Fontaine | 251/77 |
| 3,908,514 | 9/1975 | Rist | 91/391 R |

Primary Examiner—Robert E. Garrett
Assistant Examiner—Richard S. Meyer
Attorney, Agent, or Firm—Armstrong, Nikaido, Marmelstein & Kubovcik

[57] ABSTRACT

An assistor for reducing stepping force of a clutch pedal, in which a push rod is inserted into an assistor casing freely movably in the axial direction, a casing outside end of the rod is interconnected to a clutch pedal, a casing inside portion of the rod is provided with a piston which divides the casing into first and second chambers, the first chamber intercommunicates with atmosphere, the second chamber intercommunicates freely changeably with atmosphere and a negative pressure source through a change-over valve mechanism, and the piston is interlocked with the change-over valve mechanism through the means of a negative-pressure setting spring so that negative pressure for reducing stepping force can be fed into the second chamber according to a shifted length of the rod.

5 Claims, 5 Drawing Figures

ASSISTOR FOR REDUCING STEPPING FORCE

This application is a continuation of application Ser. No. 520,259, filed Aug. 4, 1983, now abandoned.

BACKGROUND OF THE INVENTION

This invention relates mainly to an assistor for reducing stepping force of a clutch pedal for use in a medium-sized automobile.

As a conventional assistor for reducing stepping force of a medium-sized automobile, there has been deviced an assistor in which a helper spring has been tensely provided on a cluch pedal to reduce stepping force by a tension of the helper spring.

However, the helper spring has been tensely provided by means of a fulcrum-passing-over system such as that equipped in a stand of bicycle, so that there has been a disadvantage that it has had no effect of reducing stepping force but a required stepping force has inversely increased at the initial state of stepping a pedal.

Further, as shown in FIG. 5, a device has been developed; in which a hydraulic servo unit 54 has been disposed between a master cylinder 52 connected to a clutch pedal 51 and a slave cylinder 53 connected to a clutch in order to magnify hydraulic force by utilizing negative pressure from a negative-pressure source 55. However, the device shown in FIG. 5 has a complex construction including a large quantity of components resulting in a high manufacturing cost because it must be equipped with a hydraulic mechanism such as an oil passage etc. in the unit 54. Moreover, this device can be used only for a hydraulic type clutch pedal, and can not be used for a wire transmitting type cluch pedal.

An object of this invention is to provide an assistor for reducing stepping force which has a simple construction and can be manufactured at a low cost, and which can perform full stepping force reducing function.

Another object of this invention is to provide an assistor for reducing stepping force which can be utilized for pedals of both hydraulically transmitting type and wire transmitting type.

In order to accomplish the above objects in this invention, a push rod is inserted into an assistor casing freely movably in the axial direction, a casing outside end of the rod is interconnected to a clutch pedal, a casing inside portion of the rod is provided with a piston which divides the casing into a first chamber and a second chamber, the first chamber intercommunicates with atmosphere and the second chamber intercommunicates freely changeably with atmosphere and a negative pressure source through a change-over valve mechanism, and the piston is interlocked with the change-over valve mechanism through the means of a negative-pressure setting spring so that negative pressure for reducing stepping force can be fed into the second chamber according to a shifted length of the rod.

DETAILED DESCRIPTION OF THE INVENTION

Figure 1:
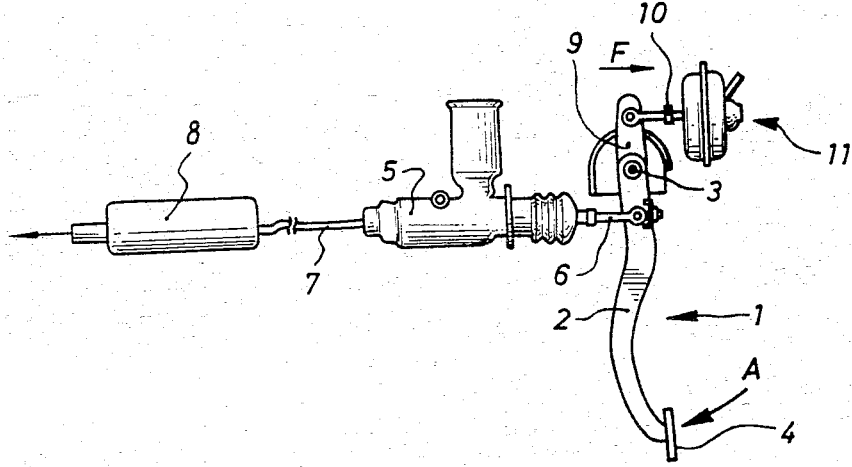
FIG. 1 is a side elevational view of a clutch pedal provided with an assistor of this invention.

In FIG. 1, an arm 2 of a clutch pedal 1 is pivotally supported by a horizontal supporting shaft at its upper end, and provided with a steppig plate 4 at its lower end. An intermediate portion of the arm 2 is pivotally interconnected to a rod 6 of a unit such as a master cylinder 5. The master cylinder 5 is connected to a slave cylinder 8 through a hydraulic pipe 7, the slave culinder 8 being interconnected to a release fork etc. of the clutch. An uprising arm 9 extending upward is integrally formed on the arm 2, and a push rod 10 of assistor 11 for reducing stepping force according to the present invention is interconnected (pivotally connected) to the uprising arm 9.

Figure 2:
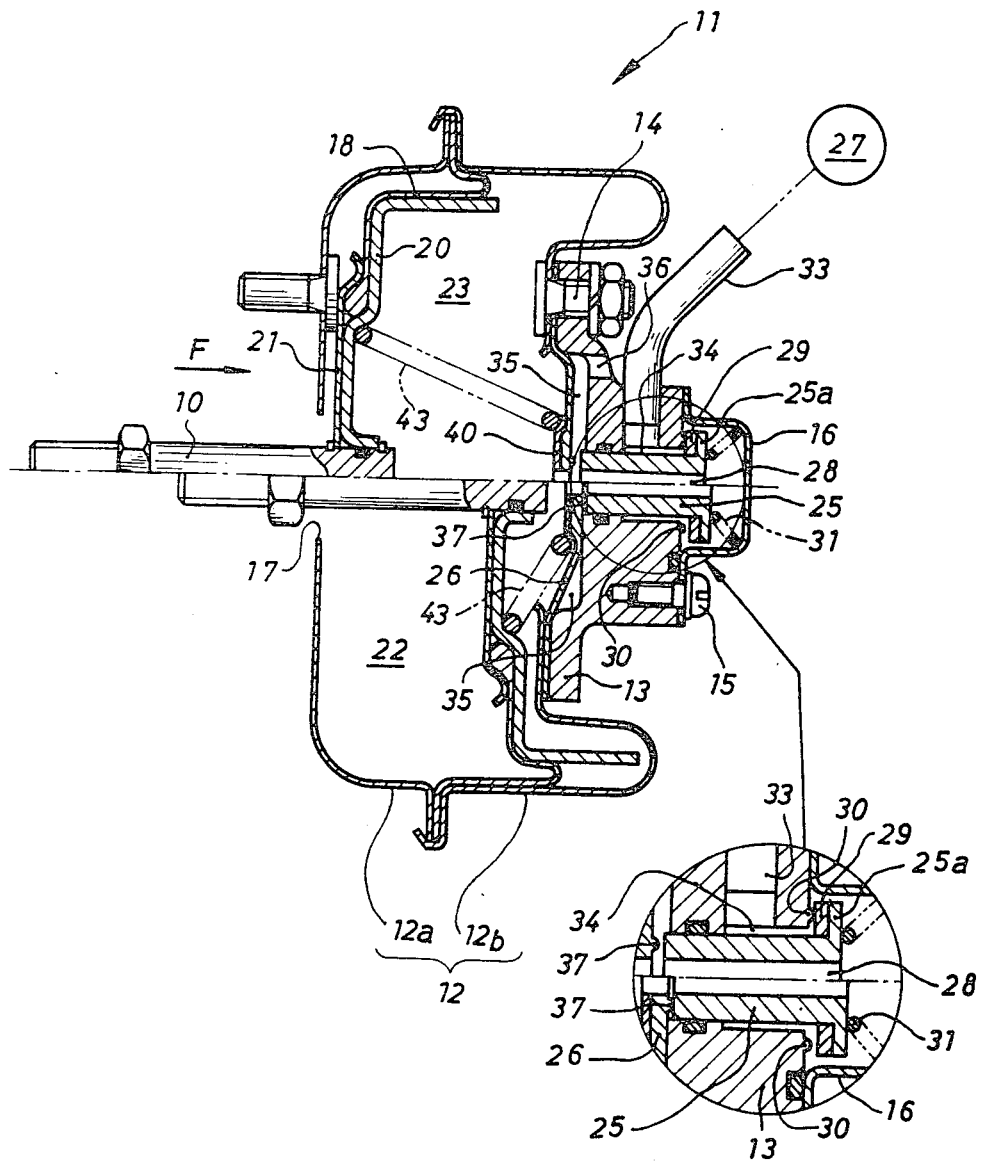
FIG. 2 is an enlarged vertical sectional view of a primary portion of FIG. 1.

FIG. 2 is an enlarged vertical sectional view of a primary portion of FIG. 1, an upper half section showing a state before stepping on a clutch pedal (FIG. 1) and a lower half section showing a state when the clutch pedal 1 is stepped on to its full stepping depth. In this FIG. 2, an assistor casing 12 consists of a pair of first and second members 12a, 12b jointed together, and a valve holder 13 is fastened to the side of the casing 12, in which direction the push rod 10 is shifted (direction of arrow F), by means of a bolt 14 etc. A cup-shaped cover 16 is fastened to the side of the arrow F of the holder 13 by means of a bolt 15.

The push rod 10 is inserted into the casing 12 freely movably in the axial direction through a rod passing hole 17 of the first casing member 12a, a piston 20 and a back plate 21 which are provided with a first rubber diaphragm 18 fit onto the casing inside portion of the rod 10, and the piston 20 and the back plate 21 are fixed to the rod 10 with snap rings so that they can move in the axial direction integrally with the rod 10. The first rubber diaphragm 18 is airtightly sandwiched between the piston 20 and the plate 21 at its inner peripheral edge, and airtightly sandwiched between annular jointing portions of both the casing members 12a, 12b at its outer peripheral edge. By the piston providing such the first rubber diaphragm 18, the inside of the casing 12 is divided into a first chamber 22 and a second chamber 23, the first chamber 22 is always intercommunicating to atmosphere through the rod passing hole 17, while the second chamber 23 being intercommunicating freely changeably to atmosphere and a negative-pressure source (for example, a vacuum pump) 27 through a change-over valve mechanism comprising such as a poppet valve 25 and a second rubber diaphragm 26 etc.

Now, the change-over valve mechanism will be described in detail hereunder. The poppet valve 25 fits in an inner peripheral surface freely slidably in the axial direction keeping liquid tightness and simultaneously provides a through hole 28 extending in the axial direction, the hole 28 interconnecting the second chamber 23 and an inside of the cover 16. The end portion at the F arrow side of the valve 25 extends out into the cover 16 and simultaneously provides an outward flange portion (valve portion) 25a integrally, and an annular rubber seat 29 is securely fixed to a side surface of the flange portion 25a. While, an annular portion 30 facing toward said seat 29 is formed on the end surface of the holder 13. A valve spring 31 is compressively provided between the end surface of the poppet valve 25 and the cover 16, the holder 13 is forced in a direction opposite to the arrow F by means of a spring force of the valve spring 31, and the seat 29 is seated on the annular projection 30 as shown by the upper half of FIG. 2. The negative-pressure source 27 is interconnected to an annular passage 34 formed between an outer peripheral surface of the valve 25 and the holder 13 through a pipe 33. The annular passage 34 can be interconnected to the inside of the cover 16 by moving the valve 25 against the spring 31 in the direction of the arrow F as shown by the lower half of FIG. 2. Namely, when the valve 25 is pushed from the upper half state of FIG. 2 in the direction of the arrow F, negative pressure is so deviced so to be fed from the negative-pressure source 27 through the pipe 33, the annular passage 34, a clearance between the seat 29 and the projection 30, the inside of the cover 16, the hole 28, and a central hole of the second rubber diaphragm 26, to the second chamber 23. The second rubber diaphragm 26 is sandwiched between the second casing member 12b and an outward flange of the holder 13 at its outer peripheral edge portion, and forms an air chamber 35 between it and a concave surface of the holder 13. The air chamber 35 intercommunicates to atmosphere through an air hole 36. An inner peripheral edge of the air chamber 35 can be opened and closed against the second chamber 23 by elastically deforming the inner peripheral edge portion of the second rubber diaphragm 26 in the axial direction. On the second rubber diaphragm 26, an annular projection 37 facing toward the end surface of the valve 25 is formed. Namely, when the inner peripheral edge portion of the second rubber diaphragm 26 is elastically deformed in the direction of the arrow F to forcibly press the annular projection 37 against the end surface of the valve 25 as shown by the lower half of FIG. 2, the intercommunication between the second chamber 23 and the air chamber 35 can be broken; while, when this state is recovered to the original one, the intercommunication between the second chamber 23 and the air chamber 35 can be established.

Further, when the second rubber diaphragm 26 is pushed from the state shown by the upper half of FIG. 2 into the direction of the arrow F, the valve 25 can be moved in the direction of the arrow F and the clearance between the seat 29 and the annular projection 30 of the holder 13 can be opened.

An annular spring seat 40 is securely fixed to the side surface opposite to the direction of the arrow F of the second diaphragm 26, a coil spring 43 for adjusting negative pressure value is compressively provided between the spring seat 40 and the piston 20, thus the piston 20 being so deviced as to be interlocked with the second rubber diaphragm 26 through this coil spring 43.

Now, the function of the assistor will be described hereunder. When the clutch pedal 1 is stepped on in the direction of the arrow A of FIG. 1, the push rod 10 moves from the position shown by the upper half of FIG. 2 in the direction of the arrow F, thus pushing the inner peripheral edge of the second rubber diaphragm 26 in the direction of the arrow F through the piston 20, the spring 43, and the spring seat 40. When the second rubber diaphragm 26 is pushed in the direction of the arrow F, the air chamber 35 closes against the second chamber 23 and simultaneously the valve 25 is pushed in the direction of the arrow F to open the clearance between the seat 29 and the annular projection 30, negative pressure is fed from the negative-pressure source 27 to the second chamber 23, thus the pedal stepping force can be reduced through this negative pressure.

Figure 3:
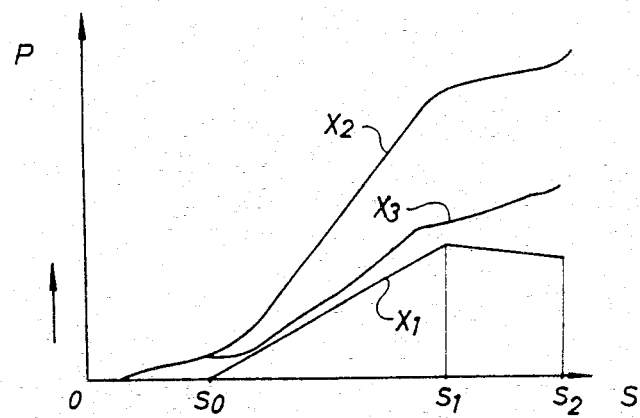
FIGS. 3 and 4 are load characteristic diagrams.

FIG. 3 is a load characteristic diagram, in which the axis of abscissa S indicates a pedal stroke and the axis of ordinate P indicates a load. The graph $X_1$ indicates a change of reduction in stepping force (a force by which the rod 10 is pulled in the direction of the arrow F) owing to the assistor 11, the graph $X_2$ indicates a change of stepping force in case of the reducing assistor 11 not equipped, and the graph $X_3$ indicates a change of stepping force in case of the assistor 11 equipped. Namely, the value of graph $X_3$ is the result of subtracting the value of graph $X_1$ from that of graph $X_2$. Further, $S_0$ is a stroke at the time when negative pressure begins to be fed into the second chamber 23, $S_1$ is a stroke at the time when negative pressure reaches its maximum value (for example, 300 mmHg), and $S_2$ is the maximum stroke.

In the region of stroke from $S_0$ to $S_1$, a force, by which the second rubber diaphragm 26 tends to be deformed in the direction opposite to the arrow F due to negative pressure in the second chamber 23 (FIG. 2), and a force of the spring 43 counterbalance each other, and the value of negative pressure is determined by this counterbalance. Consequently, the negative pressure value increases proportionally and the reduction in stepping force (graph $X_1$) also increases proportionally to an increase in the load of spring 43, which increases in proportion to an increase in the stroke.

In the region of stroke from $S_1$ to $S_2$, the load spring 43 increases but the reduction in stepping force decreases slowly by the increase in the load of spring 43 because the negative pressure value stays around the maximum value. However, the above decrease is fairly small because the reduction in stepping force at $S_2$ only slightly decreases as compared with the maximum reduction in stepping force at $S_1$, and the value of reduction in stepping force itself is a large one as seen from FIG. 3.

Also in case when the assistor 11 shown in FIG. 2 is applied to a wire transmitting type clutch, the rod 10 may be pivotally connected to the uprising arm 9 formed integrally with the arm 2 as in the case of the hydraulically transmitting type shown in FIG. 1.

Figure 4:
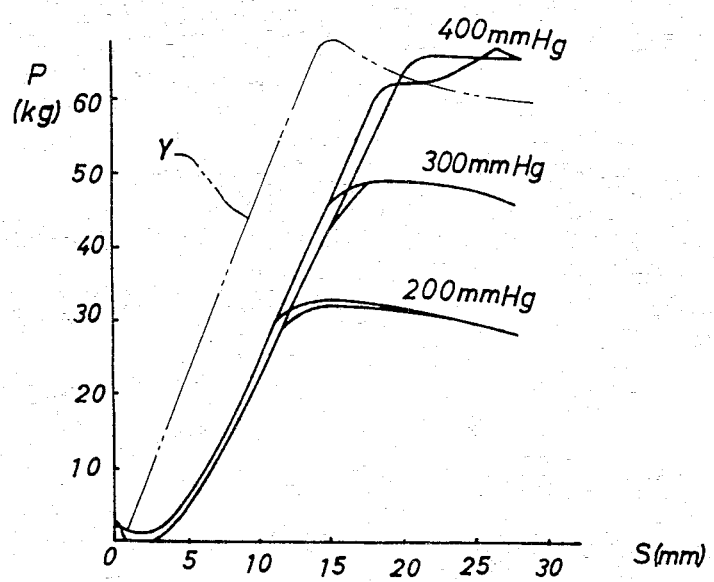

FIG. 4 shows changes of reduction in stepping force for each case, in which the maximum value of the negative-pressure source 27 (FIG. 2) is assumed as 400 mmHg, 300 mmHg, and 200 mmHg respectively. Namely, when a clutch pedal not equipped with the reducing assistor shows the change in stepping force as indicated by the curve Y, the stepping force can be reduced in proportion to an increase in stroke approximately over the entire stroke range by the use of the negative-pressure source 27 having the max. negative pressure value of 300 mmHg for example.

Figure 5:
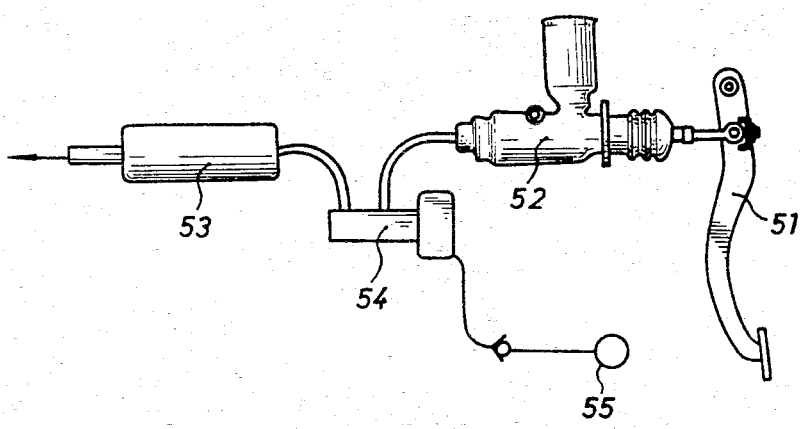
FIG. 5 is a side elevational view of a conventional embodiment.

As described above, in this invention, the push rod 10 is inserted into the assistor casing 12 freely movably in the axial direction, the casing outside end of the rod 10 is interconnected to the clutch pedal 1, the casing inside portion of the rod 10 is provided with the piston 20 which divides the casing 12 into the first and second chambers 22, 23, the first chamber 22 communicates with atmosphere and the second chamber 23 communicates freely changeably with atmosphere and the negative pressure source 27 through the change-over valve mechanism comprising such as the poppet valve 25 and the second rubber diaphragm 26 etc., and the piston 20 is interlocked with the change-over valve mechanism through the means of the negative-pressure setting spring 43 so that negative pressure for reducing stepping force can be fed into the second chamber 23 according to a shifted length of the rod 10. Therefore, this invention has the following advantages:

(1) The negative pressure for reducing stepping force according to a shifted length of the rod 10 is fed into the second chamber 23 through the means of the spring 43 and the change-over valve mechanism interlocked with the piston 20 through the spring 43, and at the same time the rod 10 is interconnected to the clutch pedal 1; so that it is not required to equip the hydraulic mechanism such as the oil passage etc. and the negative-pressure value controlling mechanism through hudraulic pressure as described in the conventional embodiment of FIG. 5, thus the construction becomes simple and the assistor can be manufactured at a low cost. Moreover, reducing function of stepping force can be obtained according to, i.e. approximately in proportion to, a shifted length of the rod 10, so that the clutch pedal can be operated very smoothly.

(2) Since the rod 10 can be interconnected to the pedal 1, the assistor can be applied not only to the hydraulically transmitting type clutch but a wire transmitting type or link transmitting type clutch. Namely, it can be put in general-purpose use.

(3) Since the rod 10 is interconnected to the pedal 1 and the reduction in stepping force is determined by a shifted length of the rod 10, the degree of freedom in designing the pedal stepping force and the stroke of pedal 1 becomes large to provide easy designing of a clutch controlling mechanism which is the most adapted to an automobile utilizing the assistor.

(4) Since the negative pressure is utilized in this device, a vacuum pump of brake which has been previously equipped in an automobile can be utilized as the negative-pressure source 27. Therefore, number of components can be reduced to provide economic assistor.

The said change-over mechanism will not be limitted to that comprising the poppet valve 25 and the second rubber diaphragm 26 as shown in FIG. 2.

What is claimed is:

1. An assistor comprising:
   an assistor casing;
   a push rod disposed in said casing and being freely movable in the axial direction thereof, said push rod having an outside end and an inside end, said outside end being connected to a clutch pedal;
   a piston disposed within said casing and connected to the inside end of said push rod, said piston dividing said casing into first and second chambers, said first chamber freely communicating with the atmosphere;
   a first rubber diaphragm securely attached around a peripheral edge of said piston, and having an outer peripheral edge securely fixed to said casing;
   change-over valve means for switching said second chamber from communication with the atmosphere to communication with a negative pressure source and vice-versa, said change-over valve means including a poppet valve connecting said negative pressure source to said second chamber and a second rubber diaphragm operatively connected to said poppet valve for sealing said second chamber from communication with the atmosphere; and
   a negative-pressure setting spring and and thus said piston being operatively interlocked with said change-over valve means such that upon the movement of said push rod toward said change-over valve means, said negative pressure source is communicated with said second chamber and the atmosphere is sealed off therefrom.

2. An assistor for reducing stepping force of a clutch pedal as set forth in claim 1, wherein said first chamber communicates with atmosphere through a hole in said casing through which said push rod passes.

3. An assistor for reducing stepping force of a clutch pedal as set forth in claim 1, wherein said poppet valve is biased to the closed position by a cone-shaped spring.

4. An assistor for reducing stepping force of a clutch pedal as set forth in claim 1, wherein said first chamber communicates with atmosphere through a hole in said casing through which said push rod passes and wherein said poppet valve is biased to the closed position by a cone-shaped spring.

5. An assistor for reducing stepping force of a clutch pedal as set forth in claim 4, wherein a cup-shaped cover covers part of said poppet valve and forms a spring seat for said cone-shaped spring and also forms a passage for negative pressure to be communicated to said second chamber.

* * * * *